United States Patent

Donnan

[15] 3,643,809
[45] Feb. 22, 1972

[54] HOLDER FOR CREDIT CARD RECEIVING MACHINE

[72] Inventor: David H. Donnan, Corpus Christi, Tex.
[73] Assignee: Guaranty National Bank and Trust of Corpus Christi
[22] Filed: Jan. 26, 1970
[21] Appl. No.: 5,874

[52] U.S. Cl. ..................................................211/49
[51] Int. Cl. ....................................................A47f 7/00
[58] Field of Search ...............211/49, 126; 101/269, 407

[56] References Cited

UNITED STATES PATENTS

| | | | |
|---|---|---|---|
| 1,926,983 | 9/1933 | Lamb | 101/269 |
| 2,994,265 | 8/1961 | Hurlbut | 101/269 |
| 3,164,254 | 1/1965 | Gore | 211/49 R X |
| 3,207,321 | 9/1965 | Joyce | 211/126 |
| 3,486,447 | 12/1969 | Stocker | 101/407 X |

*Primary Examiner*—Nile C. Byers, Jr.
*Attorney*—Clarence A. O'Brien and Harvey B. Jacobson

[57] ABSTRACT

A receptacle having a plurality of bins underlying a tray which receives a credit car imprinter. Charge forms are placed in the bins. A pocket is formed in the rear of the receptacle for accommodating an enlarged card for advertising or for explaining use of the imprinter.

6 Claims, 4 Drawing Figures

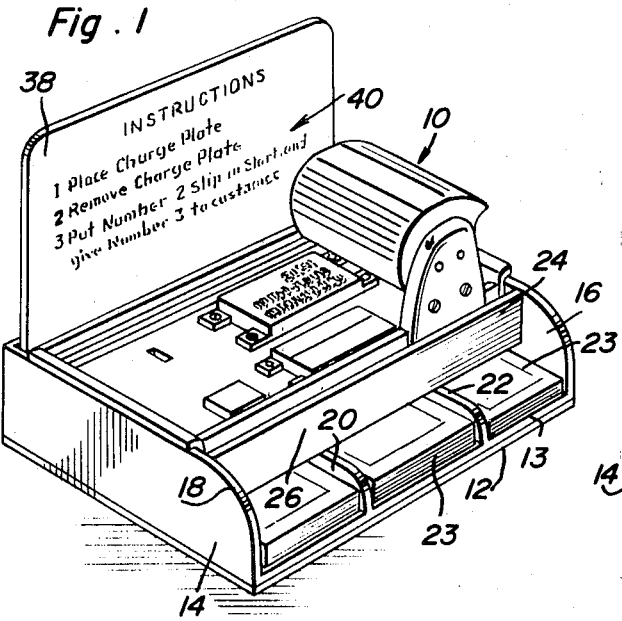
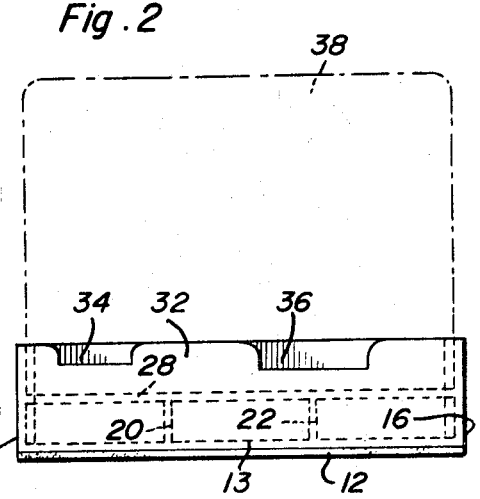
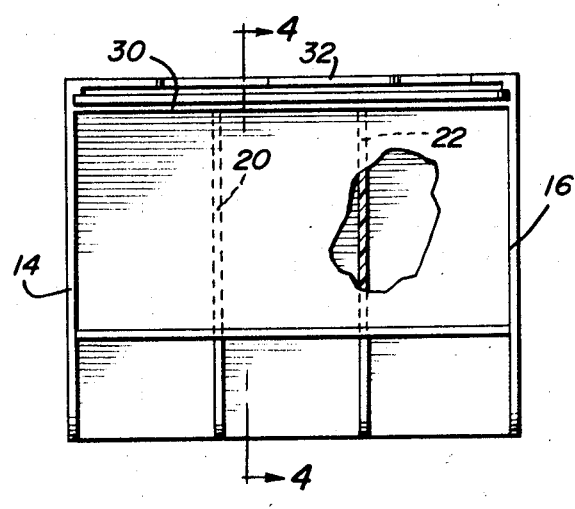
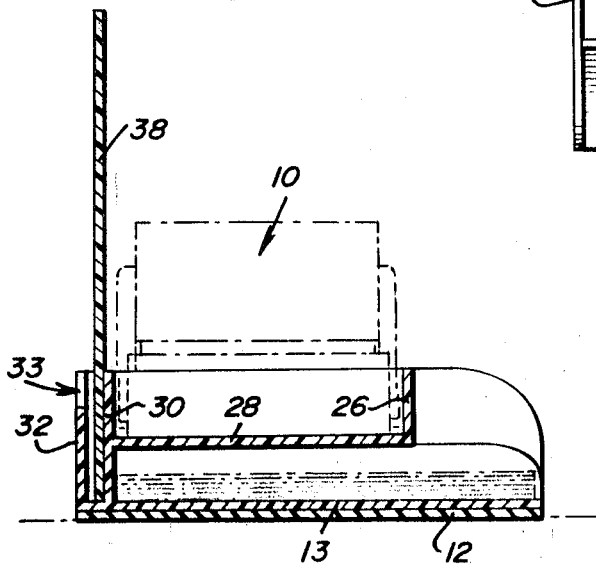
David H. Donnan
INVENTOR.

HOLDER FOR CREDIT CARD RECEIVING MACHINE

The present invention relates to receptacles and more particularly to a credit card machine holder.

During the present time, charge form imprinters utilized in most retail operations impose a requirement on merchants to maintain charge forms, application forms and other such material. Most merchants maintain these materials at distributed points removed from the imprinter itself. The inconvenience of remembering where suitable form material is kept impedes maximum business efficiency.

The main objective of this invention is to accommodate the merchant by providing him with a compact unit to house his imprinter, credit cards, sales slips, and credit card applications. Inasmuch as there is now in use numerous and sundry credit cards, this invention will be particularly helpful to the merchant who services more than one credit card by giving him a compact holder partitioned and designed in such a manner that it will serve more than one credit card service.

A primary use of the proposed invention will be for a holder serving as a ready source of advertising along with providing storage spaced and information to the merchant or user through an upstanding printed back card which is imprinted with instructions for use of the equipment, charges, applications, and other data or information necessary to the proper procedure relative to charges by credit card users.

The invention is designed for the purpose of providing an article for distribution to the merchant which will enable him to maintain all equipment necessary for credit card purchases in a small compact unit which can be used in a minimum of space, yet provide the merchant with space for credit card applications, charge slips, and the like.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of the present invention with the insertion of a conventional credit card imprinter therein.

FIG. 2 is a rear elevational view of the holder.

FIG. 3 is a top plan view of the holder having a portion thereof cut away.

FIG. 4 is a transverse sectional view taken along a plane passing through section line 4—4 of FIG. 3.

Referring to the figures and more particularly FIG. 1 thereof, reference numeral 10 generally indicates a conventional credit card imprinter which is shown positioned in the receptacle or holder which constitutes the present invention. The holder includes a nonslip pad 12 suitably attached to the base 13 of the holder. Lateral sidewalls 14 and 16 extend upwardly from the base. As will be noted, the forward edges of the sidewalls are rounded as indicated by 18. Two parallel-spaced partitions 20 and 22 extend upwardly from base 13, and in conjunction with the lateral sidewalls 14 and 16 the partitions define three adjacently disposed bins for receiving credit card forms 23 or the like.

A tray is integrally formed in rear offset relation to the bins and serves to receive the charge imprinter. As will be noted in FIG. 4, the tray includes a front wall 26 perpendicularly disposed with relation to a horizontal support portion 28 upon which the charge imprinter rests. The rear wall of the tray is indicated by 30 and is positioned in parallel spaced relation to a rearmost wall 32. The void between the rear walls 30 and 32 defines a pocket 33 for storing material therein. As shown in FIG. 2, the rear wall 32 has slots 34 and 36 formed along the upper edge thereof for aiding manipulation of material stored in the pocket. In the preferred embodiment of the invention, an enlarged instruction card 38 is positioned in the pocket 33 and lists a series of instructions generally indicated by 40 that deal with proper utilization of the charge imprinter. The card is removable if the holder is to be placed in a small enclosure that would not accommodate the card. Instead of instructions, the card can include advertising material or the like.

In summary, the present invention affords the merchant a convenient and compact unit for maintaining a charge imprinter and various forms associated therewith in a single location.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A receptacle for printed forms comprising at least one bin for receiving forms, and a tray positioned adjacent the bin for receiving a form-imprinting device, said receptacle including a base having parallel-spaced partitions extending upwardly therefrom to define a plurality of adjacent bins, said tray including support means disposed above the bins for accommodating the imprinting device, said receptacle also including parallel-spaced backwalls extending upwardly from the base to form a storage pocket.

2. The device set forth in claim 1 wherein the outermost back wall includes slots formed therein for facilitating the manipulation of material stored in the pocket.

3. The structure set forth in claim 2 together with an enlarged card removably inserted in said pocket, the card having selected indicia thereon.

4. The device defined in and according to claim 1, and, in combination, a nonslip pad underlying and attached to said base.

5. A portable unified compact holder for a credit card imprinting machine and associated readily available credit card slips, application forms and the like comprising a receptacle embodying a base having marginal upstanding end walls having corresponding rear ends joined by a complemental upstanding back wall and open at the front for access to the receptacle portion, said base having a top side provided with spaced upstanding partitions cooperating therewith and with said upstanding walls and defining open-front bins for said credit card slips and application forms, said partitions being of a height less than the height of said end walls and backwall, an open-top tray disposed between upper portions of said end walls and seated and united with coacting upper edges of said partitions and partially covering said bins, the receiver portion of said tray being adapted to supportively contain said imprinting machine, said tray having a front wall spaced rearwardly from a forward marginal edge of said base.

6. The holder defined in and according to claim 5, and wherein said tray embodies an upstanding backwall spaced from the backwall of said receptacle and providing a storage pocket for an insertable and removable indicia card.

* * * * *